United States Patent Office 3,787,493
Patented Jan. 22, 1974

---

3,787,493
PROCESS FOR THE PREPARATION OF 3-CYCLO-PENTENE-1,1-DICARBOXAMIDE
Dong H. Kim, Wayne, and Stanley C. Bell, Penn Valley, Pa., assignors to American Home Products Corporation, New York, N.Y.
No Drawing. Filed Oct. 19, 1971, Ser. No. 190,641
Int. Cl. C07c 103/19
U.S. Cl. 260—557 R          4 Claims

ABSTRACT OF THE DISCLOSURE

A process for the preparation of 3-cyclopentene-1,1-dicarboxamide is described which comprises reacting malonamide with a cis 1,4-dihalo-2-butene in the presence of a strong base.

---

This invention relates to a process for the preparation of 3-cyclopentene-1,1-dicarboxamide which is useful as an intermediate in the preparation of 6-(1-amino-3-cyclopentene-1-carboxamido)penicillanic acid.

The process of the present invention is illustrated by the following equation:

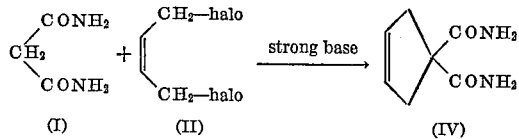

In carrying out this process at least 2 moles of a strong base are required so that the anion of malonamide (Formula I) can displace both halogens of the cis 1,4-dihalo-2-butene in order to form the cyclopentene ring. The reaction sequence is believed to be as follows:

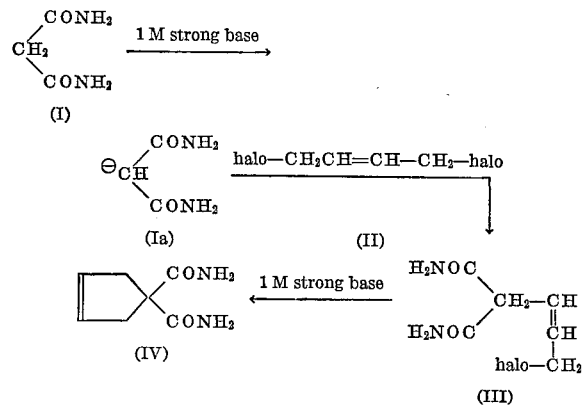

As used herein halo means chloro, bromo, iodo or fluoro. In the process of the present invention the reaction of malonamide with a cis 1,3-halo-2-butene is carried out in the presence not only of a strong base but also in organic solvent as represented by the process steps from Ia to IV. Similarly the reaction that occurs in going from I to Ia takes place in the presence of an organic solvent. The temperature employed in mixing malonamide with a strong base is generally reflux temperature and the reaction of Ia and II is carried out by heating to reflux temperature for a period of one to five hours. However, a temperature in the range of 65 to 100° C. may be employed in carrying out the aforedescribed reactions.

The compounds of Formula II may be prepared in accordance with well known prior art processes such as described by J. M. Bobbitt et al., J. Org. Chem. 25, 2230 (1960).

As previously indicated at least 2 moles of a strong base are required to complete the reaction to obtain the compound of Formula IV, preferably the number of moles of strong base should not exceed 3 moles. The selection of a strong base is not critical except that is one that will generate anions in solution by abstracting a proton from the methylene linkage of malonamide. Illustrative of suitable bases are sodium ethoxide, sodium hydride, potassium ethoxide, potassium methoxide and sodium propoxide. Suitable inert organic solvents that may be used in carrying out the process of the present invention are illustrated by lower alkanols such as ethanol, propanol; benzene, etc.

The compound of Formula IV is useful for the preparation of 6-(1-amino-3-cyclopentene-1-carboxamido)penicillanic acid as shown in Example 3 below.

The following examples are illustrative of the preparation of 3-cyclopentene-1,1-dicarboxamide and cis 1,4-dichloro-2-butene:

EXAMPLE 1

Cis-1,4-dichloro-2-butene

Thionyl chloride (208 g.) is added drop wise over the period of about three hours to a mixture of cis-2-butene-1,4-diol (54 g.) and 1 ml. of pyridine under chilling and stirring. The resulting mixture is allowed to stand overnight at room temperature then distilled under reduced pressure; B.P. 82°/88 mm. Mg. The yield of the above titled product is 66%.

EXAMPLE 2

3-cyclopentene-1,1-dicarboxamide

Malonamide (5.1 g.) is added to a freshly prepared warm sodium ethoxide-ethanol solution obtained by dissolving 2.5 g. of sodium in 140 ml. of absolute ethanol, and the resulting mixture is refluxed for 15 min., then cooled to room temperature. Seven and one-half grams of cis-1,4-dichloro-2-butene is diluted with an equal volume of absolute ethanol and is added dropwise to the mixture with stirring and heating, and the resulting mixture is refluxed for 3 hrs. This mixture is concentrated by distilling off ca. 50 ml. of ethanol, then diluted with 25 ml. of hot water. Refrigeration of the mixture causes separation of a precipitate which is collected on a filter and washed with 10 ml. of cold 50% ethanol several times. The product weighs 3.2 g. (41.5% yield) after being dried in vacuo over $P_2O_5$ at 100° C., and melted at 217–220° C. Recrystallization from 50% ethanol improved the M.P. to 223–225° C. A mixture M.P. with an authentic sample was not depressed.

The following examples describe the use of 3-cyclopentene-1,1-dicarboxamide as an intermediate in the preparation of 6 - (1-amino-3-cyclopentene-1-carboxamido) penicillanic acid.

EXAMPLE 3

3-cyclopentene-1,1-dicarboxamide (44.4 g., 0.29 mole), is added to a solution of sodium hypobromite (made from sodium hydroxide 35 g., 0.88 mole and bromine 46.5 g., 0.29 mole in 40 ml. of water) at 0° C. in an ice- salt bath. The diamide dissolves and the solution is allowed to warm to room temperature overnight. The clear solution gives a negative reaction with starch-iodide paper but as a precautionary measure 7 g. of ammonium bicarbonate are added and the solution is warmed to 50° C. on a steam bath before acidifying to pH 2 with 12 N hydrochloric acid. The acidified solution is evaporated to dryness, the residue extracted with 500 ml. of hot acetone and then filtered. The filtrate is evaporated to dryness in vacuo and the crude product twice crystallized from 400 ml. of hot water to afford 1,3-diazaspiro[4,4]non-7-ene-2,4-dione, total yield 25.6 g. (53.4%), M.P. 190–193° C.

*Analysis.*—Calc'd for $C_7H_8N_2O_2$ (percent): C, 55.24; H, 5.30; N, 18.41. Found (percent): C, 54.85; H, 5.09; N, 18.61.

EXAMPLE 4

1,3-diazaspiro[4,4]non-7-ene-2,4-dione (16.6 g., 0.11 mole), as prepared in Example 3, barium hydroxide octahydrate 85 g., 0.27 mole, and 100 ml. of water are heated in a steel autoclave at 200° C. for twenty hours. The mixture is dissolved in dilute hydrochloric acid and 36 N sulfuric acid 15 ml. is then added with stirring. The precipitate is filtered and the filtrate evaporated to dryness in vacuo. The residue is extracted with hot methanol to remove sodium chloride and the methanolic solution containing the product and ammonium chloride is evaporated to dryness. The residue is dissolved in water and passed through a strong acid resin in the hydrogen cycle. After washing with water, the column is eluted with one liter of 2 N ammonium hydroxide. The effluent is evaporated to dryness and the product crystallized from methanol-ethanol to afford 1-amino-3-cyclopentene-1-carboxylic acid (yield 6 g., 40%), M.P. 295–300° C. (dec.).

*Analysis.*—Calc'd for $C_6H_9NO_2$ (percent): C, 56.55; H, 7.13; N, 11.01. Found (percent): C, 56.71; H, 7.04; N, 10.94.

The compound of this example is used in the manner described in U.S. Pat. 3,558,602 to obtain 6-(1-amino-3-cyclopentene-1-carboxamido)penicillanic acid.

What is claimed is:

1. A process for preparing 3-cyclopentene-1,1-dicarboxamide which comprises reacting malonamide with a cis 1,4-dihalo-2-butene in the presence of a strong base which will generate anions in solution by abstracting a proton from the methylene linkage of malonamide, and an organic solvent, at least 2 moles of said strong base being present during said reaction per mole of malonamide.

2. A process according to claim 1 wherein a portion of said strong base is reacted with said malonamide prior to introduction of said cis 1,4-diahlo-2-butene.

3. A process according to claim 2 wherein said cis 1,4-dihalo-2-butene is cis 1,4-dichloro-2-butene and wherein said strong base is selected from the class consisting of sodium ethoxide, sodium hydride, potassium ethoxide, potassium methoxide and sodium propoxide.

4. A process for preparing 3-cyclopentene-1,1-dicarboxamide which comprises reacting malonamide with about 2 to 3 moles of a strong base per mole of said malonamide in the presence of an inert organic solvent at a temperature between about 65 and 100° C., said strong base being selected from the class consisting of sodium ethoxide, sodium hydride, potassium ethoxide, potassium methoxide and sodium propoxide, and thereafter reacting cis 1,4-dichloro-2-butene with said reaction product of said malonamide and said strong base in the presence of an inert organic solvent at a temperature between about 65° and about 100° C. to form 3-cyclopentene-1,1-dicarboxamide.

References Cited

Murdock et al.: J. Org. Chem., vol. 27, pp. 2395–98 (1962).

Skinner et al.: J. Am. Chem. Soc., vol. 72, pp. 1648–49 (1950).

HARRY I. MOATZ, Primary Examiner

PO-1050
(5/69)

UNITED STATES PATENT OFFICE
CERTIFICATE OF CORRECTION

Patent No. 3,787,493          Dated January 22, 1974

Inventor(s) Dong H. Kim and Stanley C. Bell

It is certified that error appears in the above-identified patent and that said Letters Patent are hereby corrected as shown below:

Column 1, lines 45-50, structural formula (III) should be as shown below:

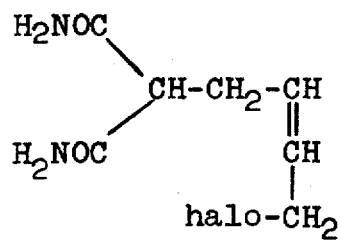

Column 1, line 54, "cis 1,3-halo-2-butene" should read -- "cis 1,4-halo-2-butene--"

Column 2, line 26, "Mg" should read --Hg--

Column 4, line 6, (claim 2), "diahlo" should read --dihalo--.

Signed and sealed this 19th day of November 1974.

(SEAL)
Attest:

McCOY M. GIBSON JR.
Attesting Officer

C. MARSHALL DANN
Commissioner of Patents